(12) United States Patent
Zuckerberg et al.

(10) Patent No.: US 8,572,174 B2
(45) Date of Patent: *Oct. 29, 2013

(54) PERSONALIZING A WEB PAGE OUTSIDE OF A SOCIAL NETWORKING SYSTEM WITH CONTENT FROM THE SOCIAL NETWORKING SYSTEM SELECTED BASED ON GLOBAL INFORMATION

(75) Inventors: Mark E. Zuckerberg, Palo Alto, CA (US); Ray C. He, Mountain View, CA (US); Spencer Ahrens, Menlo Park, CA (US); Yofay Kari Lee, Palo Alto, CA (US); Chaitanya Mishra, Palo Alto, CA (US); Austin Daniel Haugen, San Francisco, CA (US); Xin Liu, San Jose, CA (US); Michael Steven Vernal, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/551,508

(22) Filed: Jul. 17, 2012

(65) Prior Publication Data

US 2012/0284615 A1  Nov. 8, 2012

Related U.S. Application Data

(63) Continuation of application No. 12/764,928, filed on Apr. 21, 2010, now Pat. No. 8,250,145.

(51) Int. Cl.
 *G06F 15/16* (2006.01)
(52) U.S. Cl.
 USPC ........................................................ 709/204
(58) Field of Classification Search
 USPC .......................... 709/204, 219, 228; 715/235
 See application file for complete search history.

(56) References Cited

U.S. PATENT DOCUMENTS 6,418,441 B1    7/2002  Call
7,783,721 B2 *  8/2010  McCollum et al. ........... 709/218
7,783,750 B1 *  8/2010  Casey et al. .................. 709/224

(Continued)

FOREIGN PATENT DOCUMENTS

WO    WO 2009/061617 A1    5/2009
WO    WO 2009/086014 A1    7/2009

OTHER PUBLICATIONS

Australian Government—IP Australia, Patent Examination Report No. 1, Australian Patent Application No. 2011243009, Sep. 19, 2012, 2 Pages.

(Continued)

*Primary Examiner* — Tesfay Yohannes
(74) *Attorney, Agent, or Firm* — Fenwick & West LLP

(57) ABSTRACT

A user device requests a web page from a web server of a third-party website, which is separate from a social networking system. The web server from the third-party website sends a markup language document for the requested web page to the user device which includes an instruction for a browser application running on the user device to incorporate information obtained from the social networking system within the web page. Based on the instruction in the received markup language document, the user device requests personalized content from the social networking system, which generates the requested personalized content based on social information about the user. The user device then renders the web page with the personalized content contained in a frame and displays the rendered web page and the frame to the user.

21 Claims, 5 Drawing Sheets

(56) References Cited

U.S. PATENT DOCUMENTS

| | | | |
|---|---|---|---|
| 7,860,751 B2 | 12/2010 | Mangalick et al. | |
| 7,962,578 B2 * | 6/2011 | Makar et al. | 709/219 |
| 8,156,180 B2 * | 4/2012 | Adelman | 709/203 |
| 8,260,926 B2 * | 9/2012 | Narayana et al. | 709/226 |
| 8,285,813 B1 * | 10/2012 | Colton et al. | 709/217 |
| 2004/0002878 A1 | 1/2004 | Maria Hinton | |
| 2004/0128393 A1 | 7/2004 | Blakley, III et al. | |
| 2005/0144279 A1 | 6/2005 | Wexelblat | |
| 2007/0067297 A1 * | 3/2007 | Kublickis | 707/9 |
| 2007/0288247 A1 | 12/2007 | Mackay | |
| 2007/0299967 A1 | 12/2007 | Brady | |
| 2008/0120396 A1 | 5/2008 | Jayaram et al. | |
| 2008/0307085 A1 | 12/2008 | Curran et al. | |
| 2009/0077471 A1 * | 3/2009 | Lahr et al. | 715/748 |
| 2009/0112701 A1 | 4/2009 | Turpin et al. | |
| 2009/0164597 A1 | 6/2009 | Shuster | |
| 2009/0172021 A1 | 7/2009 | Kane et al. | |
| 2009/0265243 A1 | 10/2009 | Karassner et al. | |
| 2009/0288012 A1 | 11/2009 | Hertel et al. | |
| 2010/0076851 A1 * | 3/2010 | Jewell, Jr. | 705/14.67 |
| 2010/0121959 A1 * | 5/2010 | Lin et al. | 709/228 |
| 2010/0161714 A1 | 6/2010 | Dongre | |
| 2010/0185949 A1 * | 7/2010 | Jaeger | 715/730 |
| 2010/0217645 A1 | 8/2010 | Jin et al. | |
| 2010/0223157 A1 | 9/2010 | Kalsi | |
| 2010/0235762 A1 | 9/2010 | Laiho et al. | |
| 2011/0066957 A1 | 3/2011 | Prats et al. | |
| 2011/0161513 A1 | 6/2011 | Viers | |
| 2011/0161802 A1 * | 6/2011 | Jia et al. | 715/235 |
| 2011/0202847 A1 | 8/2011 | Dimitrov | |
| 2011/0264736 A1 | 10/2011 | Zuckerberg et al. | |
| 2011/0265011 A1 | 10/2011 | Taylor et al. | |
| 2012/0072416 A1 * | 3/2012 | Gowel | 707/723 |

OTHER PUBLICATIONS

United States Patent and Trademark Office, Non-Final Rejection, U.S. Appl. No. 13/549,485, Sep. 14, 2012, 18 Pages.
United States Patent and Trademark Office, Non-Final Rejection, U.S. Appl. No. 13/551,498, Nov. 2, 2012, seventeen pages.
Canadian Intellectual Property Office, Office Action, Canadian Patent Application No. 2,796,944, Jun. 5, 2013, four pages.
United States Office Action, U.S. Appl. No. 13/549,485, Feb. 15, 2013, twenty-four pages.
United States Office Action, U.S. Appl. No. 13/551,498, Mar. 25, 2013, twenty-one pages.

* cited by examiner

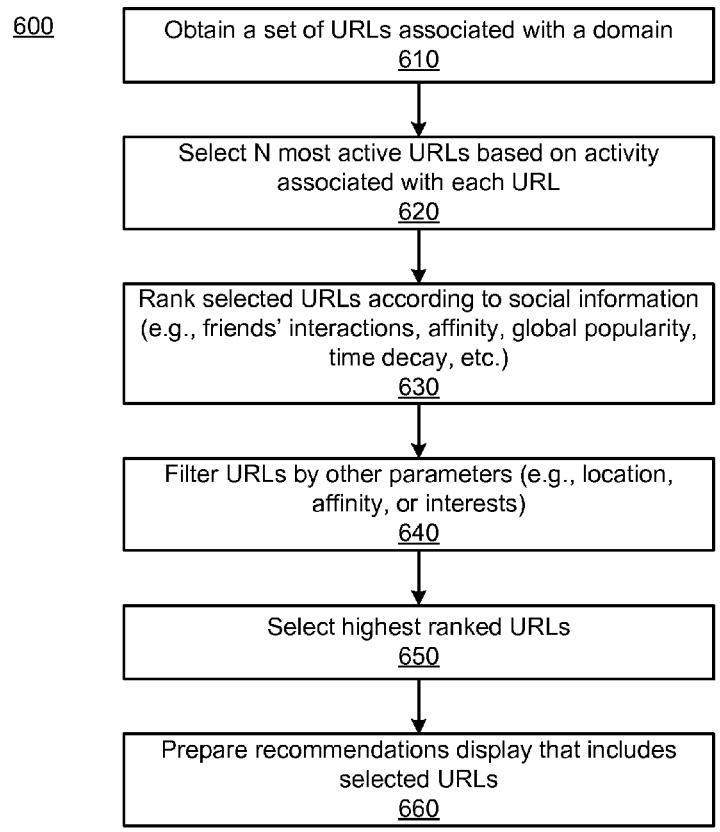
FIG. 6
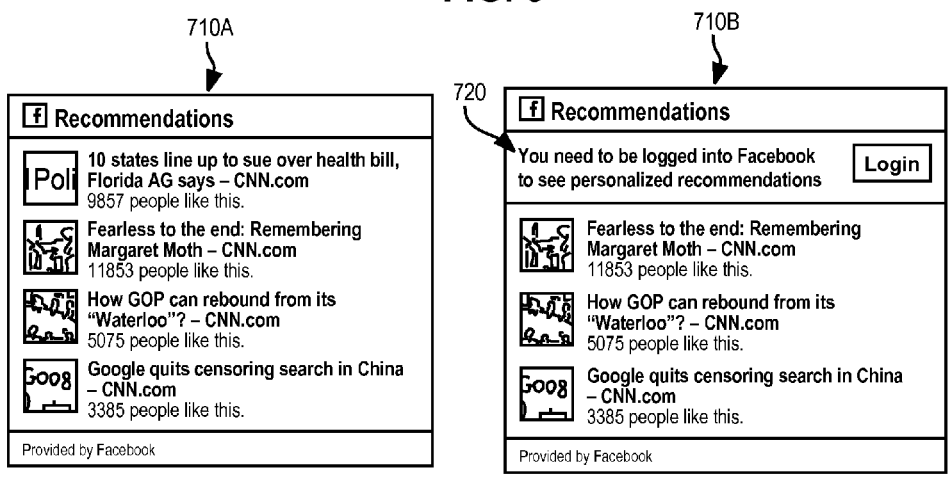
FIG. 7A
FIG. 7B

PERSONALIZING A WEB PAGE OUTSIDE OF A SOCIAL NETWORKING SYSTEM WITH CONTENT FROM THE SOCIAL NETWORKING SYSTEM SELECTED BASED ON GLOBAL INFORMATION

CROSS-REFERENCE TO RELATED APPLICATIONS

This application is a continuation of U.S. application Ser. No. 12/764,928, filed on Apr. 21, 2010, which is hereby incorporated by reference in its entirety.

BACKGROUND

This invention relates generally to social networking, and more particularly to extending social content outside of a social networking system by personalizing a third-party website with content from the social networking system.

In a typical social networking system, such as a social networking website, users set up their user profiles and then establish connections with other users of the social networking system. The users often provide information about themselves expressly to the social networking system, such as demographic information and/or a list of the users' interests. Users may also provide information about themselves implicitly to the social networking system, through their actions on the system and interactions with other users. In this way, a social networking system can obtain a rich set of social information about its users, which may be used in a great many ways to enhance a user's experience online.

However, most websites that a user visits online do not have access to this rich set of social information, and in fact most do not even know the identity of their users. Assembling enough information about a user's social connections for these purposes typically requires a system to interact with a large number of users over an extended period of time, and most websites do not have the resources, expertise, or user base required to build and maintain this social information. Accordingly, these systems will offer an inferior experience, since any customization or personalization provided by these sites is unlikely to reflect information about the user's social connections and their actions.

For example, a news website may provide a number of web pages that each contain a story about a particular event. Users of a social networking system may comment about the story, even specifically referring to that web page offered by the news website. However, without having access to this social information about the users, the news website cannot leverage on these useful interactions to enhance the experience of other users who visit the news website. Accordingly, it would be beneficial to offer a mechanism to third-party websites, which are in a domain that is different from a domain of a social networking system, to provide personalized content for their users based on social information about those users that is maintained by, or otherwise accessible to, the social networking system.

SUMMARY

To allow third-party websites to leverage social information maintained in a social networking system, embodiments of the invention enable a third-party website to incorporate personalized content for a user in a web page provided by the third-party website. The personalized content is provided by the social networking system, which maintains social information about the user. The personalized content may be presented in a frame or window of a web page when it is rendered and displayed on a user device.

In one embodiment, a user device requests a web page from a web server of a third-party website, which is separate from a web server of a social networking system. The web server from the third-party website sends a markup language document for the requested web page to the user device. The markup language document includes an instruction for a browser application running on the user device to incorporate within the web page information obtained from the social networking system. In one embodiment, the instruction creates a frame within the web page that contains content pulled directly from the social networking system (e.g., an iframe). Based on the instruction in the received markup language document, the user device requests personalized content from the social networking system, which determines the requested personalized content based on social information about the user. Thereafter, the user device renders the web page with the personalized content contained within the frame and displays the rendered web page to the user. In this way, the third-party website has a simple mechanism for incorporating personalized content for the user based on social information, without requiring the third-party website itself to maintain—or even have access to—the user's social information.

Embodiments of the invention enable various types of personalized content to be provided on the third-party website. In one example, the personalized content may comprise a "recent activity" window, which contains a selection of actions performed by the user's connections and related to a particular web page, or collection of web pages. The actions may include various actions tracked, or otherwise collected, by the social networking system that a user may perform in relation to a particular web page, such becoming a fan of (or "liking" or otherwise expressing interest in) the web page, posting a link to the web page, or posting a comment that includes a URL associated with the web page. For example, a high-level web page of a news website may contain a window that lists a user's friends' posts about stories on the website, where each story is associated with a web page. In another example, a retail website may provide web pages associated with various products, where each product web page includes a frame that contains reviews of (or links thereto), recommendations for, or expressions of interest in, the associated product by the user's friends, by all users of the social networking system, or by users of the social networking system filtered in some other manner (e.g., by location, age group, etc.).

In another example, the personalized content may comprise a "recommendations" window, which comprises a set of recommended web pages for a user based on social information about the user. The web pages may be associated with a particular domain, such that the window provides the user with a short listing of web pages within a particular website that the user is likely to find interesting. In one embodiment, the recommended web pages are selected based on the number of times that the user's friends (or connections) in the social networking system have interacted with the web pages. For example, a landing page of a news website may recommend web pages within the website that contain stories that the user's friends have commented on or shared frequently within the social networking system.

The personalized content provided by the social networking system may be filtered and/or ranked based on a number of criteria, including, without limitation, the user's interests, demographic information, the affinity for other objects in the social networking system, location information, geo-location information, keywords or tags (either dictated by the third-party website and/or by the user), and a decay factor. The criteria may be dictated by the third-party website, for example, by passing the criteria as a parameter in a URL for drawing the frame, as specified in the markup language document. For example, a news website may not care about the user's location, whereas a restaurant review website would care. In such a case, the third-party website may pass a parameter that comprises a flag, indicating to the social networking system whether the personalized content should be filtered to exclude content that does not match the user's location. It is noted that the third-party website need not know the user's location, as the filtering may be done entirely by the social networking system. In another embodiment, the filtering and/or ranking need not be specified by the third-party website, and can instead be perform by the social networking system. For example, the social networking system may personalize content for a user by applying an affinity function for the user to each content item, thereby providing the user with the content that is most likely to be relevant to the user. A great number of variations and applications are possible, as will be appreciated.

BRIEF DESCRIPTION OF THE DRAWINGS

FIG. 6 is a flow chart of a process for obtaining personalization of content that comprises a "recommendations" window that comprises a set of recommended web pages for a user based on social information related to the user, in accordance with an embodiment of the invention.

FIGS. 7A and 7B are partial screen shots of a rendered frame of personalized content generated from the process of FIG. 6, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
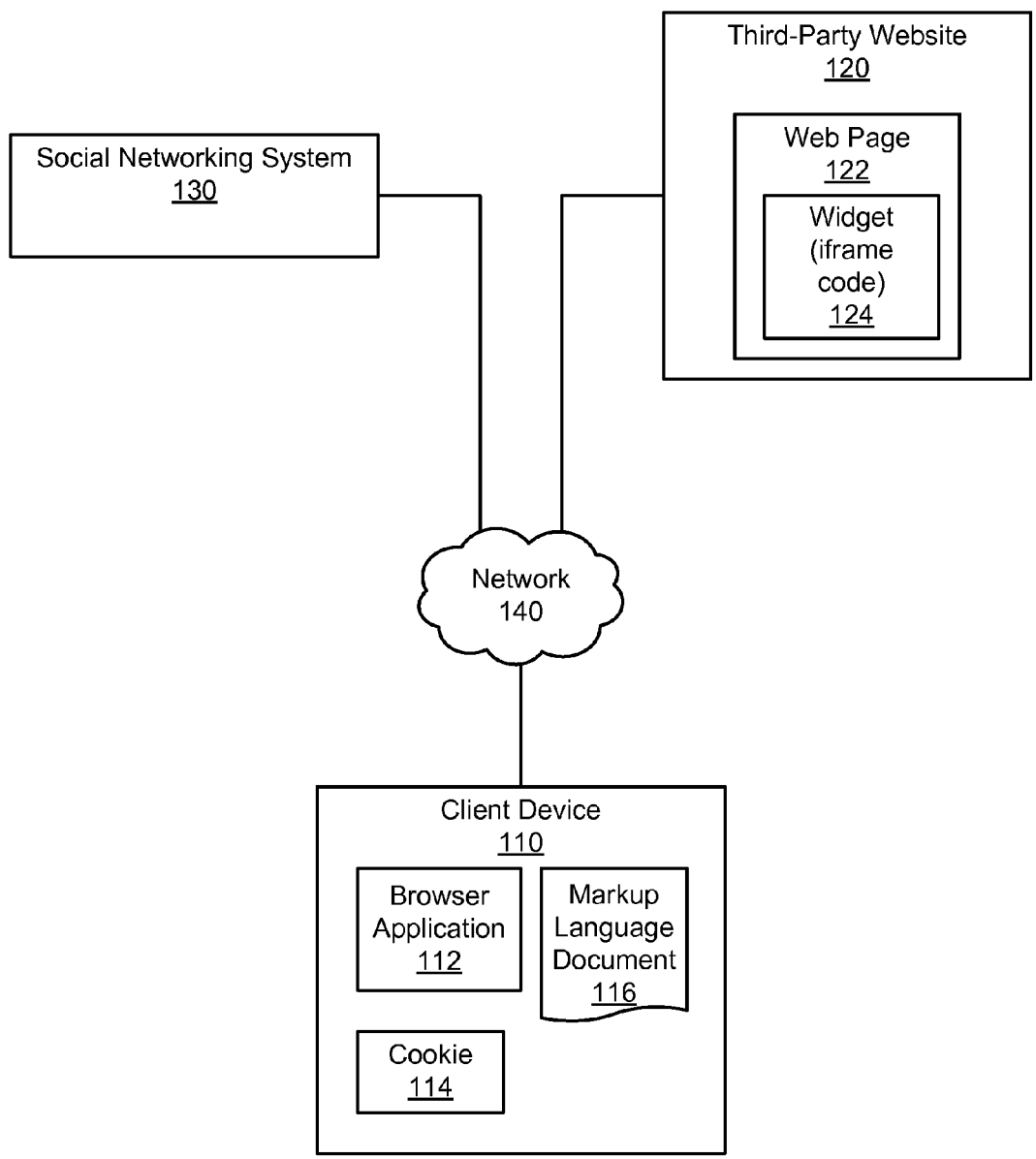
FIG. 1 is a network diagram of a system for providing personalization of content to a user of a social networking system, in accordance with an embodiment of the invention.

FIG. 1 is a network diagram of one embodiment of a system 100 for providing personalized content to a user of a social networking system 130. The system 100 includes one or more user devices 110, one or more third-party websites 120, the social networking system 130 and a network 140. For purposes of illustration, the embodiment of the system 100 shown by FIG. 1 includes a single third-party website 120 and a single user device 110. However, in other embodiments, the system 100 may include more user devices 110 and/or more third-party websites 120. In certain embodiments, the social networking system 130 is operated by the social network provider, whereas the third-party websites 120 are separate from the social networking system 130 in that they may be operated by different entities. In various embodiments, however, the social networking system 130 and the third-party websites 120 operate in conjunction to provide social networking services to users of the social networking system 130. In this sense, the social networking system 130 provides a platform, or backbone, which other systems, such as third-party websites 120, may use to provide social networking services and functionalities to users across the Internet.

The user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the third-party website 120 and the social networking system 130 via the network 140, which may comprise any combination of local area and/or wide area networks, using both wired and wireless communication systems.

In one embodiment, the user device 110 displays content from the third-party website 120 or from the social networking system 130 by processing a markup language document 116 received from the third-party website 120 or from the social networking system 130 using a browser application 120. The markup language document 116 identifies content and one or more instructions describing formatting or presentation of the content. By executing the instructions included in the markup language document 116, the browser application 112 displays the identified content using the format or presentation described by the markup language document 116. For example, the markup language document 116 includes instructions for generating and displaying a web page having multiple frames that include text and/or image data retrieved from the third-party website 120 and/or the social networking system 130. In various embodiments, the markup language document 116 comprises a data file including extensible markup language (XML) data, extensible hypertext markup language (XHTML) data or other markup language data.

In one embodiment, the user device 110 also includes a cookie 114 including data indicating whether a user of the user device 110 is logged into the social networking system 130. The cookie 114 indicates whether the user of the computing device 110 is involved in an active session where the user device 110 exchanges data with the social networking system 130, allowing modification of the data communicated from the social networking system 130 to the user device 110. Use of the cookie 114 in exchanging data between the user device 110, the social networking system 130 and/or the third-party website 120 is further described below in conjunction with FIG. 3.

The third-party website 120 comprises one or more web servers including one or more web pages 122, which are communicated to the user device 110 using the network 140. The third-party website 120 is separate from the social networking system 130. For example, the third-party website 120 is associated with a first domain while the social networking website is associated with a separate social networking domain. A web page 122 included in the third-party website 120 comprises a markup language document identifying content and including instructions specifying formatting or presentation of the identified content, as described above. In one embodiment, a web page 122 includes a widget 124 comprising instructions that, when executed by a browser application 112 of a user device 110, retrieve data from the social networking system 130 and display the information retrieved from the social networking system 130. For example, the widget 124 comprises an instruction associated with the social networking system 130 that generates a frame within the web page that includes information from the social networking system 130. Hence, the widget 124 allows a web page 122 from the third party website 120 to provide personalized content using information from the social networking website 130 when the web page 122 is rendered and displayed by a browser application 112 of a user device 110.

The social networking system 130 comprises one or more computing devices storing a social network, or mapping of a social graph, comprising a plurality of users and providing users of the social network with the ability to communicate and interact with other users of the social network. The social networking system 130 is further described below in conjunction with FIG. 2. In use, users of the social networking system 130 add connections to a number of other users of the social networking system 130 to whom they desire to be connected. As used herein, the term "friend" or the term "a connection" refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user," "friend" and "connection" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in a third-party website 120, separate from the social networking system 130, coupled to the social networking system 130 via a network 140.

The social networking system 130 is also capable of connecting a variety of entities. For example, the social networking system 130 enables users to interact with each other as well as third-party websites 120 or other entities through an API or other communication channels.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data, content and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact within the social networking system 130.

Figure 2:
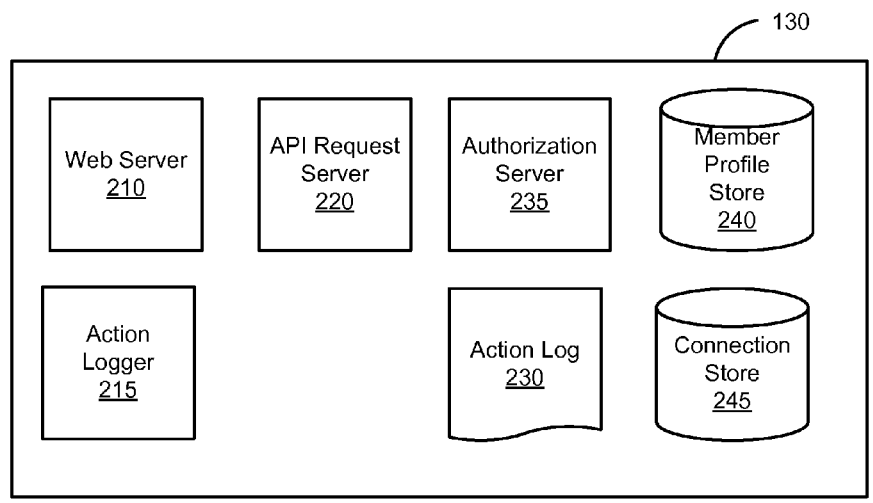
FIG. 2 is a diagram of a social networking system, in accordance with an embodiment of the invention.

FIG. 2 is a diagram of one embodiment of a social networking system 130. The embodiment of a social networking website 130 shown by FIG. 2 includes a web server 210, an action logger 215, an API request server 220, an action log 230, a user profile store 240, and a connection store 245. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network. The user profiles include biographic, demographic, and other types of descriptive information, such as work experience, educational history, hobbies or preferences, interests, location, and the like. The social networking system 130 further stores data describing one or more connections between different users in the connection store 245. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The web server 210 links the social networking system to one or more user device 110 and/or one or more third-party websites 130 via the network 240. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 220 allows one or more third-party websites 120 to access information from the social networking system 130 by calling one or more APIs. The API request server 220 may also allow third-party websites 120 to send information to social networking website by calling APIs. For example, a third-party website 120 sends an API request to the social networking system 130 via the network 140 and the API request server 220 receives the API request. The API request server 220 processes the request by calling an API associated with the API request to generate an appropriate response, which the API request server 220 communicates to the third-party website 120 via the network 140. For example, responsive to an API request, the API request server 220 collects data associated with a user and communicates the collected data to the third-party website 120.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in an action log 240. In one embodiment, the social networking system maintains the action log 230 as a database of entries. When an action is taken within the social networking system 130, an entry for the action is added to the action log 230.

Additionally, user actions may be associated with an entity outside of the core social networking system 130, such as a third-party website 120 that is separate from the social networking system website 130. For example, the action logger 215 receives data describing a user's interaction with a third party website 120 from the web server 210. Examples of actions where a user interacts with a third-party website 120 includes a user expressing an interest in a third-party website 120 or another entity, a user posting a comment to the social networking system 130 that discusses a third-party website 120, or a web page 122 within the third-party website 120, a user posting to the social networking system 130 a Uniform Resource Locator (URL) or other identifier associated with a third-party website 120, a user attending an event associated with a third-party website 120 or any other action by a user that is related to a third-party website 120. Thus, the action log 240 may include actions describing interactions between a social networking system user and a third-party website 120 that is separate from the social networking system 130.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, third-party websites 120 or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, all third-party websites 120, specific third-party websites 120, or all external systems. One embodiment allows the specification of the set of entries comprise an enumeration of entities, for example, the user may select a list of third-party websites 120 that are allowed to access certain information. Another embodiment allows the specification to comprise a set of entities along with exceptions that are not allowed to access the information. For example, a user may allow all third-party websites 120 to access the user's work information but specify a list of third-party websites 120 that are not allowed to access the work information. Certain embodiments call the list of exceptions that are not allowed to access certain information a block list. External systems, such as third-party websites 120, belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

For example, a user's privacy setting indicates that a first friend is allowed to access the user's work phone number and the user's mobile phone number while preventing the first friend from accessing other information about the user, such as the user's profile photo or the user's list of friends. However, the user's privacy setting indicates that a second friend is allowed to access the user's friend list. The information associated with a user includes actions taken by a user such as the action of adding a new friend 330. The user 130 can completely block another user or an application from accessing any information associated with the user 130. A user or an application that is blocked by the user 130 does not have access to any information associated with user 130.

The authorization server 235 contains logic to determine if certain information associated with a user can be accessed by a user's friends, third-party websites 120 and/or other applications and entities. For example, a third-party website 120 that attempts to access a user's comment about a URL associated with the third-party website 120 must get authorization from the authorization server 235 to access the user's work phone number. Based on the user's privacy settings, the authorization server 235 determines if another user, a third-party website 120, an application or another entity is allowed to access information associated with the user, including information about actions taken by the user. For example, the authorization server 235 uses a users privacy setting to determine if the user's comment about a URL associated with the third-party website 120 can be accessed by the third-party website 120. This enables a user's privacy setting to specify which other users, or other entities, are allowed to receive data about the user's actions or other data associated with the user.

Additionally, the social networking system 130 maintains data about objects with which a user may interact with using the social networking system 130. To maintain this data, the user profile store 240 and the connection store 245 store instances of the corresponding type of objects maintained by the social networking system 130. Each object type has information fields that are suitable for storing information appropriate to the type of object. For example, the user profile store 240 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

The connection store 245 includes data structures suitable for describing a user's connections to other users, connections to third-party websites 120 or connections to other entities. The connection stores 245 may also associate a connection type with a user's connections, which may be used in conjunction with the user's privacy setting, further described above, to regulate access to information about the user.

Figure 3:
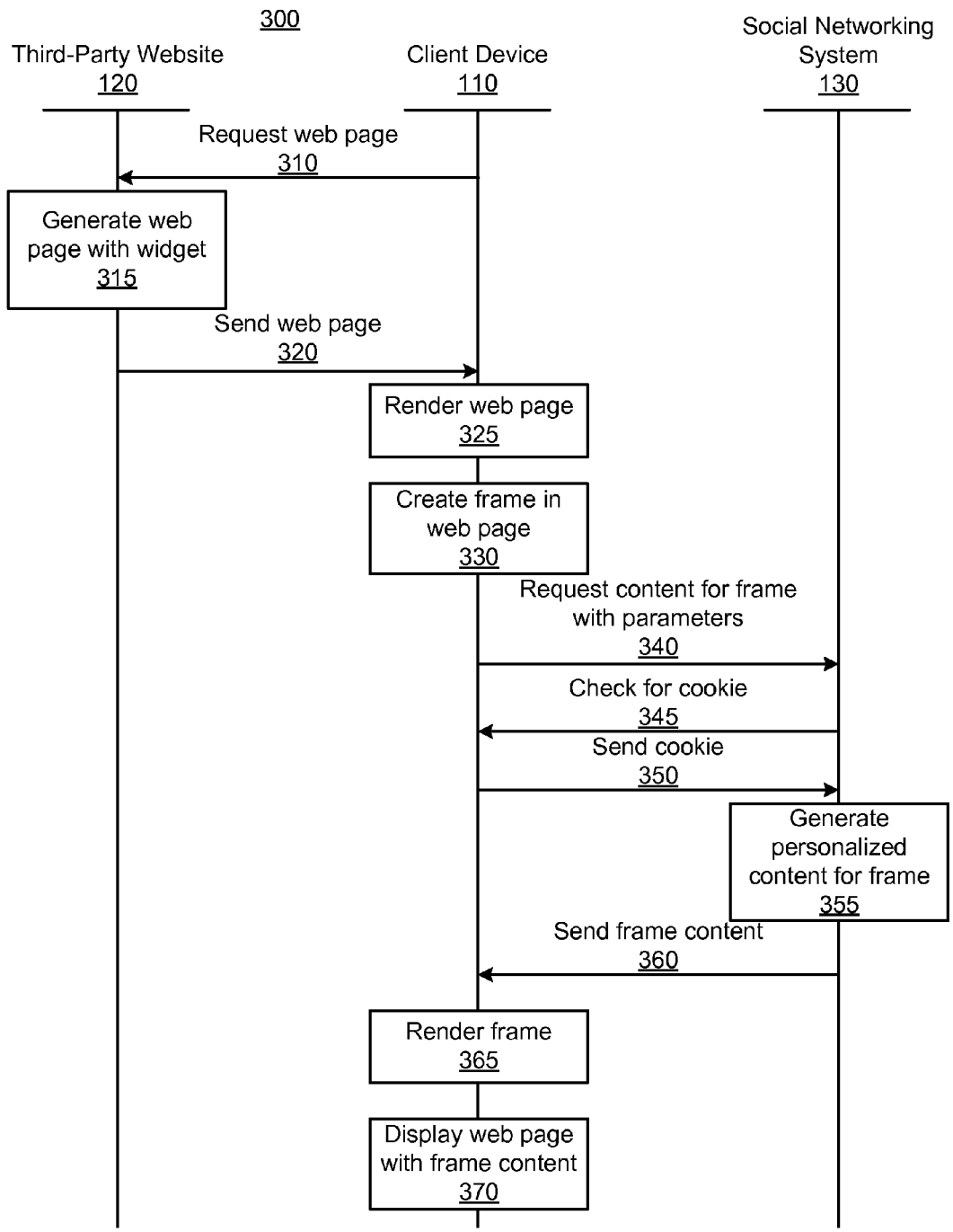
FIG. 3 is an interaction diagram of a process for providing personalization of content to a user of a social networking system, in accordance with an embodiment of the invention.

Personalization of a Third-Party Web Page with Information from the Social Networking System FIG. 3 is an interaction diagram of one embodiment of a process 300 for providing personalized content to a user of a social networking system 130 in conjunction with a web page 122. In the embodiment shown by FIG. 3, the third-party website 120 is separate from the social networking system 130. For example, the third-party website 120 may be a separate and distinct domain from the domain of the social networking system 130. Initially, a user device 110 requests 310 a web page 122 from the third-party website 120. For example, a user of the user device 110 enters a uniform resource locator (URL) or other identifier associated with the web page 122 into a browser application 112 operating on the user device 110. The browser application 112 identifies the third-party website 120 associated with the received URL or other identifier and requests 310 a web page 122 associated with the received URL or other identifier from the identified third-party website 120.

After receiving the request for the web page 122, the third-party website 120 generates the requested web page 122 using locally-stored data. For example, the third-party website 120 generates 315 a markup language document 116 describing the content and formatting of the web page 122 based on stored data. The third-party website 120 includes a widget 124 comprising instructions that, when executed by a browser application 112 of a user device 110, retrieve data from the social networking system 130 and display the information retrieved from the social networking system 130. For example, the widget 124 comprises one or more instructions that, when executed by the browser 112, retrieve information from the social networking system 130 and generate a frame within the web page 122 including the retrieved information.

In one embodiment, the widget 124 comprises code that generates an iframe within the web page 122. The widget 124 includes a uniform resource locator (URL), or other web page identifier, associated with the social networking system 130 and may also include one or more parameters describing presentation of the frame, or iframe, by the browser 112 of the user device 110.

For example, the widget 124 may comprise an instruction such as <ifame src="http://www.socialnetwork.com/widgets/recommendations.php?header=false& height=300&width=500&site=externalwebsite.com scrolling="no" frameborder="0" style="border: medium none; overflow: hidden; height: 300px; width: 500px;"></iframe>, which generates an iframe including data from the URL www.socialnetwork.com/widgets/recommendations.php and identifier parameters such as height, width and border style of the iframe. The widget 124 may also include one or more filter criteria used by the social networking system 130 to generate content for display in the iframe. In the example widget 124 above, the filter criteria is the "site=externalwebsite.com" parameter. Use of the filter criteria by the social networking system 130 is further described below.

Then third-party website 120 then sends 320 the markup language document 116 describing the generated web page 122 and including the widget 124 to the user device 110 through the network 140. After receiving the markup language document 116, the browser 112 renders 325 the web page 122 based on the content and formatting instructions included in the markup language document 116. In addition to rendering 325 the web page 124, the browser 112 in the user device 110 executes the widget 124 to create 330 a frame in the web page 330. Execution of the widget 124 also causes the browser 112 to request 340 information from the social networking system 130 for inclusion in the frame via the network 140. In one embodiment, the browser 112 identifies one or more parameters from the widget 124 and transmits the identified parameters to the social networking system 130 when requesting 340 information for inclusion in the frame. For example, one or more filter criteria are identified from the widget 124 and transmitted to the social networking system 130 when information is requested 340, allowing customization of the requested information.

Responsive to receiving the request for information from the browser 112, the social networking system 130 checks 545 the user device 110 for a cookie 114. In response to the social networking system 130 checking 545 for the cookie 114, the user device 110 sends 550 the cookie 114, or a message associated with the cookie 114, to the social networking system 130. In one embodiment, the existence of cookie 114 indicates whether the user of the computing device 110 is a user of the social networking system 130 (e.g., whether the user has a valid account with the social networking system 130). If the user of the computing device 110 is a user of the social networking system 130, the cookie 114 may contain information indicating whether the user is logged into the social networking system 130 (e.g., whether the user has a current valid session with the social networking system 130). Checking 545 the user device 110 for a cookie 114 thus allows the social networking system 130 to authenticate the user session. In other embodiments, the social networking system 130 may just determine whether the user is a user of the social networking system 130, e.g., by checking 545 for an existence of a cookie, without determining whether the user is logged into the social networking system 130. Although cookies are described herein for authenticating the user and/or the user session, any other methods of user or session identification or authentication may be used (such as recognizing a physical token).

If the user associated with the received cookie 114 has been authenticated, the social networking system 130 generates 555 information for personalization for the user associated with the received cookie 116. For example, the social networking system 130 generates 355 a "recent activity" window including a selection of actions associated with a third-party website 120 identified by a parameter from the widget 124. Examples of actions associated with a third-party website 120 may be a friend of the user expressing an interest in a web page associated with the third-party website 120 or a friend of the user posting a comment including a uniform resource locator (URL) associated with the third-party website 120. Generation of a "recent activity" window by the social networking system 130 is further described below in conjunction with FIGS. 4-5B.

As another example, the social networking system 130 generates 355 a "recommendations" window that identifies a set of third-party websites 120, or web pages associated with third-party websites 120, based on social information about the user. Generation of the "recommendations" window is further described below in conjunction with FIGS. 6-7B. The recommended web pages may be associated with a domain specified by a parameter of the widget 124. In one embodiment, the domain specified by the parameter of the widget 124 is the domain associated with the third-party website 120 from which the web page was requested 310. However, in an alternative embodiment, the domain specified by the parameter of the widget 124 differs from the domain associated with the third-party website 120 from which the web page is requested. In another embodiment, the parameter of the widget 124 may identify multiple domains, allowing the widget to retrieve and present information from the multiple domains identified by the parameter of the widget; for example, a news web site may use the widget to present information from itself along with information from other affiliated web sites, such as a weather web site and a spots news web site.

For example, the widget 124 may comprise an instruction such as <ifame src="http://www.socialnetwork.com/widgets/recommendations.php?header=false&height=300&width=500&site=externalwebsite.com scrolling="no" frameborder="0" style="border: medium none; overflow: hidden; height: 300px; width: 500px;"></iframe>, and the parameter "site=externalwebsite.com" is transmitted by the browser 112 of the user device 110 when requesting 340 information for inclusion in the frame. When generating 355 personalized content for a user associated with a cookie 114, the social networking system 130 uses the domain "externalwebsite.com" to limit the generated information to actions or other information associated with the domain "externalwebsite.com." For example, the social networking system 130 generates a list of all actions by friends or connections of the user associated with the cookie 114 associated with "externalwebsite.com," and generates 355 information for inclusion in the frame from the list of actions associated with "externalwebsite.com" performed by friends or connections of the user associated with the cookie 114.

However, if the social networking system 130 is unable to authenticate the user associated with the received cookie 114, the social networking system 130 communicates a prompt for the user to enter authentication information into the user device 110 and generates 355 information for inclusion in the frame based on actions taken by all users of the social networking system 130. Thus, until the social networking system 130 receives authentication information associated with the user associated with the received cookie 114, the information generated 355 by the social networking system 130 may be global information, based on actions performed by all users of the social networking system 130 rather than on actions performed by friends or connections of the user associated with the received cookie 114. After receiving and verifying authentication information associated with the user associated with the cookie 114, the social networking system 130 generates 355 information for inclusion in the frame that is personalized for the user associated with the cookie 114, as described above.

Similarly, if the user device 110 does not send 350 a cookie 114 to the social networking system 130, it generates 355 information for inclusion in the frame based on actions taken by all users of the social networking system 130 (i.e., global information rather than personalized content). In one embodiment, the social networking system 130 also includes in the frame a prompt for joining, or otherwise using, the social networking system 130. Alternatively, the social networking system 130 generates 355 information for inclusion in the frame based on actions taken by all users of the social networking system 130 in response to receiving a message from the user device 110 indicating that no cookie 114 is stored. For example, the social networking system 130 generates 355 information from actions associated with a domain identified by the widget 124 performed by all users of the social networking system 130.

The social networking system 130 then sends 360 the frame content to the user device 110 through the network 140. The browser application 112 included on the user device 110 then renders 365 using the frame using the information received from the social networking system 130 (and in some embodiments information generated by the website) and displays 370 the web page 122 and the frame, with the information from the social networking system 130 displayed in the frame. By including the widget 124 in the markup language document 116 describing a web page 122, the third party website 120 allows information from the social networking system 130 to personalize content for a user to be displayed along with the web page 122. Because the widget 124 requests 340 information from the social networking system 130 for inclusion in the frame, the third party website 120 does not maintain, or even access, a user's social information, as the social networking system 130 personalizes and filters content after determining the user's personal information from the cookie 116 stored on the user device 110.

Figure 4:
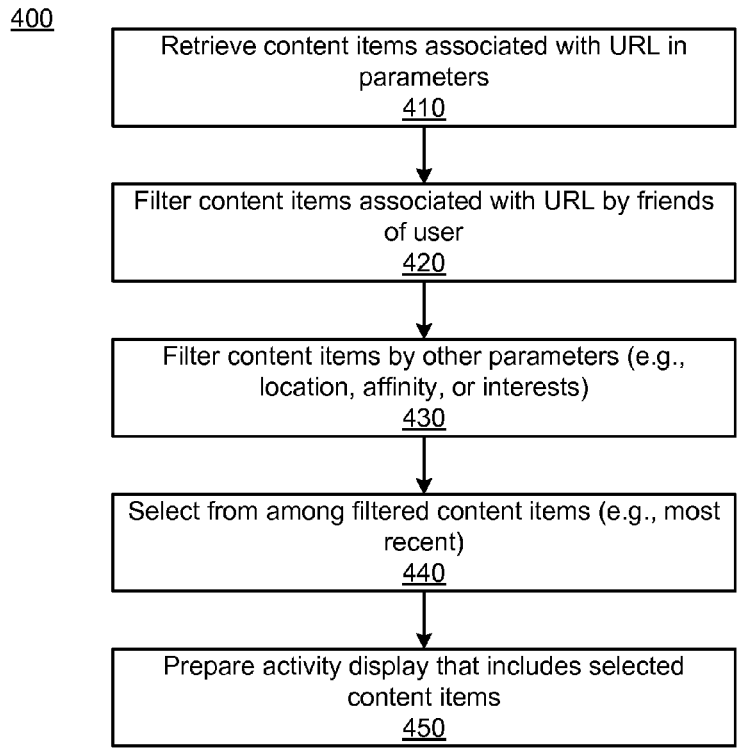
FIG. 4 is a flow chart of a process for obtaining personalization of content that comprises a "recent activity" window that comprises a user's connections' actions in relation to a web page URL, in accordance with an embodiment of the invention.
Figure 5A:
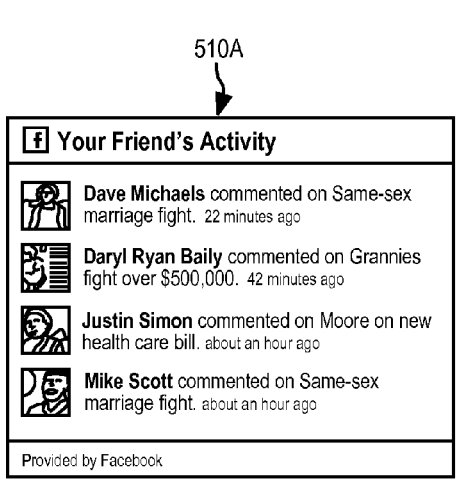
FIGS. 5A and 5B are partial screen shots of a rendered frame of personalized content generated from the process of FIG. 4, in accordance with an embodiment of the invention.
Figure 5B:
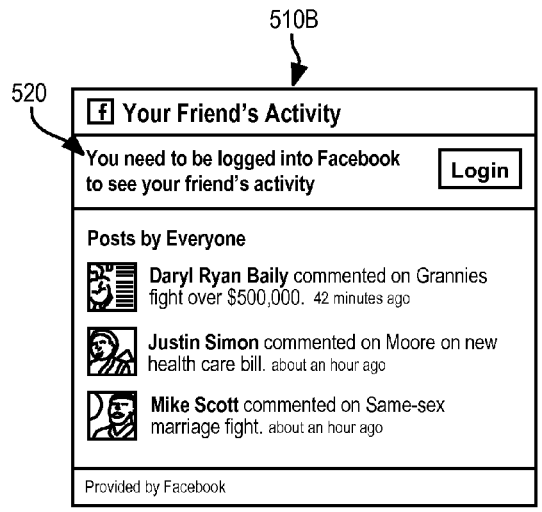

FIG. 4 is a flow chart of one embodiment of a process 400 for obtaining personalized information from a social networking system 130 that comprises a "recent activity" window including actions of a user's connections in relation to a web page URL identified by a widget 126 in a markup language document 116 describing a web page 122. FIGS. 5A and 5B are partial screen shots of examples of a rendered frame of personalized content generated from the process of FIG. 4.

Once the social networking system 130 receives the request for information from the user device 110, the social networking system 130 identifies one or more parameters included in the request and retrieves 410 content items associated with the one or more parameters. For example, one parameter is a uniform resource locator (URL) or other web identifier that specifies a web page or a domain. In one embodiment, the URL or web identifier specifies a domain associated with the third-party website 120 providing the web page 122 including the widget 124 requesting information. Alternatively, the URL or web identifier specifies a domain different than the domain associated with the third-party website 120 providing the web page 122 including the widget 124 requesting information. In another embodiment, a plurality of URLs or domains are included as parameters in the request, in which case information is retrieved from multiple web pages 122, websites, and/or domains. For example, specifying a plurality of domains or URLs allows retrieval of information from websites associated with multiple domains or retrieval of information from multiple web pages 122 within a domain. Hence, the social networking system 130 may retrieve 410 content items associated with one or more URLs or web identifier associated with the received request for information. For example, the social networking system 130 retrieves 410 content items where users express an interest in the URL or web identifier from the request for information, content items where users post a comment to the social networking system 130 discussing the URL or web identifier from the request for information, content items where users post the URL or web identifier from the request for information, content items where users attend an event associated with the URL or web identifier from the request for information or any other action by users logged by the social networking system 130 that is related to the URL or web identifier from the request for information.

In response to receiving a cookie 114, or other form of user identification and authentication, from the user device 110, the social networking system 130 filters 420 the retrieved content items. In one embodiment, responsive to the cookie 114 identifying a user of the social networking system 130, or otherwise authenticating the user and/or user session, the retrieved data is filtered 420 so that content items associated with the URL or web identifier from the request for information and also associated with friends of the user identified by the cookie 114 remain. This filtering 420 allows the social networking system 420 to remove content items associated with users that are not connected to the user identified by the cookie 114. When filtering 420 to identify content items associated with users connected to the user identified by the cookie 114, the social networking system 114 accounts for a privacy setting associated with each user, which determines whether or not the user identified by the cookie 114 is able to view or access a content item.

In one embodiment, the remaining content items (i.e., the content items associated with both the URL or web identifier from the request for information and with users connected to an identified user), are again filtered 430 according to one or more additional parameters. For example, the filtered content items may be again filtered based on the interests of the user identified by the cookie 116, demographic information of the user identified by the cookie 116, the affinity of the user identified by the cookie 116 for other objects in the social networking system 130, location information of the user identified by the cookie 116, keywords or tags (dictated by the third party website 120 or the user), a decay factor or any other suitable parameter. In one embodiment, the social networking system 130 receives the additional parameters with the request for information, allowing the third party website 120 to specify the criteria by which content items are filtered by the social networking system 130. For example, the request for information includes a parameter specified by the third party website 120 indicating whether or not to apply a decay factor to the content items, allowing different third party websites 120 to remove or maintain content items based on the age of the content items. Alternatively, the additional parameters may be locally maintained or determined by the social networking system 130 and/or by the user. For example, the social networking system 130 additionally filters 420 content items by applying an affinity function associated with the user identified by the cookie 116 to the content items, allowing the social networking system 130 to provide content items most likely to be relevant to the user identified by the cookie 116.

A subset of the filtered content items is selected 440 and used to prepare 450 an activity display including the subset of selected content items. For example, content items occurring most recently or occurring within a specified time interval are selected 440 and used to prepare 450 an activity display including the most recent content items or the content items occurring within a specified time interval. However, in different embodiments, various criteria may be used by the social networking system 130 to select 440 a subset of the filtered content items used to prepare 450 an activity display. In one embodiment, content items in the activity display may be aggregated, so if a content item is associated with multiple users connected to the identified user, the content items are aggregated and displayed as a single content item. Additionally, if a limited number of content items are associated with the URL or website identifier and also associated with users connected with the user identified by the cookie 114, the activity display may also include content items associated with any user of the social networking system 130 and associated with the URL or website identifier. For example, if less than a threshold number of content items are associated with the URL or website identifier and also associated with users connected with the user identified by the cookie 114, additional content items associated with the URL or website identifier are selected 440 from any content items associated with the URL or website identifier.

FIG. 5A shows an example of a rendered frame of personalized content 510A including an activity display including a subset of the filtered content items. The rendered frame of personalized content 510A includes content items associated with a specified domain and also associated with friends of a user identified by a cookie 114 from the user device 110. Display of the rendered frame of personalize content 510A allows a web page from a third-party website 120 to be augmented with personalized information from the social networking system 130 tailored to the identified user.

However, if the received cookie 114, or other authentication information, identifies a user of the social networking system 130 that is not logged into, or otherwise has a valid session with, the social networking system 130, or if no cookie 116, or other authentication information, is received by the social networking system 130, the retrieved content items associated with the URL or web identifier associated with the received request for content are not additionally filtered. Hence, if an identified user is not logged into, or otherwise has a valid session with, the social networking system 130 or if no user is identified, content items are selected 440 from all content items in the social networking system 130 associated with the URL or web identifier associated with the received request for content. When preparing 450 the activity display from the content items, the social networking system 130 includes a prompt for authentication information in the activity display. For example, the activity display includes a request for a login and password in addition to content items selected 440 from all content items associated with the URL or web identifier associated with the received request for content. This allows the web page 122 to present information from the social networking system 130, even though the information is based on content items provided by users of the social networking system 130 that are not necessarily connected to an identified user.

FIG. 5B shows an example of a rendered frame of personalized content 510B presenting an activity display that includes a subset of content items from all users of the social networking system 130 associated with a URL or web identifier associated with the received request for information. The activity display presented by the rendered frame of personalized content 510B includes a login portion 520 prompting entry of authentication information, such as a login and password, specifying a user of the social networking system 130.

In one embodiment, the social networking system 130 aggregates the content items in the activity display. The aggregation may be based on a common element of the content items, such as by URL. For example, the frame may include an aggregation of a plurality of content items that are each associated with the same URL, such as "5 of your friends comments on this URL." The aggregation may also be for a given time period, which may exclude older content items, such as "6 people liked this in the last minute." In this way, the social networking system 130 determines content items for the personalized content in the frame while preventing redundant stories. This may also beneficially show trends in a particular user's social information.

FIG. 6 is a flow chart of one embodiment of a process 600 for obtaining personalization information from a social networking system 130 that comprises a "recommendations" window including a set of recommended web pages for a user based on social information about the user. FIGS. 7A and 7B are partial screen shots of a rendered frame of personalized content generated from the process of FIG. 6, in accordance with an embodiment of the invention.

Once the social networking system 130 receives the request for information from the user device 110, the social networking system 130 obtains 610 a set of uniform resource locators (URLs) or other web page identifiers associated with a uniform resource locator (URL) or other web identifier that specifies a web page or a domain included in the request for information. For example, the social networking system 130 obtains 610 all URLs included in a domain identified by the URL included in the request for information. Based on activity associated with the obtained URLs, the social networking system 130 selects 620 a subset of the most active obtained URLs. In one embodiment, the social networking system 130 counts the number of content items associated with each of the obtained URLs and identifies a predetermined number of URLs having the largest number of associated content items as the most active URLs. For example, the social networking system 130 selects 620 a predetermined number of obtained URLs based on the number of content items where users express an interest in an obtained URL, the number of content items where users post a comment in the social networking system 130 discussing an obtained URL, the number of content items where users post an obtained URL, the number of content items where users attend an event associated with an obtained URL and/or the number of any other actions by users that are related to the obtained URL.

The social networking system 130 ranks 630 the predetermined number of obtained URLs according to social information associated with a user. The social networking system 130 identifies the user using a cookie 114 received from the user device 110. In one embodiment, responsive to the cookie 114 identifying a user of the social networking system 130 and that the user is logged into, or otherwise has a valid session with, the social networking system 130, the social networking system 130 ranks 630 the predetermined number of obtained URLs according to social information of the identified user. For example, the number of interactions with an obtained URL by friends of the identified user, application of an affinity function associated with the identified user to an obtained URL, a time decay and a popularity of an obtained URL among all users of the social networking system 130 is used to rank 630 the predetermined number of obtained URLs.

In one embodiment, after ranking 630 the predetermined number of obtained URLs, the social networking system 130 filters 640 the ranked URLs using one or more additional parameters. For example, the ranked URLs items may be filtered based on the interests of the identified user, an affinity of the identified user, location information of the identified user, keyword or tag, or any other suitable parameter. In one embodiment, the social networking system 130 receives the additional parameters with the request for information, allowing the third party website 120 to specify the criteria by which URLs are filtered. Alternatively, the additional parameters may be locally maintained or determined by the social networking system 130.

The social networking system 130 then selects 650 the highest ranked URLs and prepares 660 a recommendations display including the selected URLs. If the ranked URLs are filtered 640 by one or more additional parameters, the highest ranked URLs remaining after the filtering 640 are selected 650 and used to prepare 660 the recommendations display.

FIG. 7A shows an example of a rendered frame of personalized content 710A including a recommendations display presenting URLs recommended based on social information of an identified user. For example, the rendered frame of personalized content 710A includes URLs within an identified domain likely to be of interest to the identified user. Displaying the rendered frame of personalized content 710A allows a web page 122 from a third party website 120 to be augmented with personalization information from the social networking system 130 suggesting additional URLs included in the third party website 120 likely to be of interest to the identified user.

However, if the social networking system 130 does not identify a user that is logged into, or otherwise has a valid session with, the social networking system 130, the social networking system 130 selects a predetermined number of most active URLs and selects 650 a number of the most active URLs. For example, the social networking system 130 selects a predetermined number of obtained URLs based on the number of content items where users express an interest in an obtained URL, the number of content items where users post a comment to the social networking system 130 discussing an obtained URL, the number of content items where users post an obtained URL, the number of content items where users attend an event associated with an obtained URL and/or the number of any other actions by users that are related to the obtained URL. When the social networking system 130 is unable to identify a user or is unable to identify a user that is logged into, or otherwise has a valid session with, the social networking system 130, URLs are selected 650 from the most active URLs and used to prepare 660 the recommendations display. Hence, the URLs included in the recommendations display are based on activity associated with URLs performed by all users of the social networking systems 130, rather than based on social information associated with an identified user.

In one example, the social networking system 130 identifies the domain "externalwebsite.com" from a request for content from the user device 110. The social networking system 130 then obtains 610 a set of uniform resource locators (URLs) or other web page identifiers associated with "externalwebsite.com." For example, the social networking system 130 obtains 610 URLs of web pages included in "externalwebsite.com." The social networking system 130 then selects 620 a subset of the URLs included in "externalwebsite.com" based on activities by users of the social networking system 130 associated with the URLs included in "externalwebiste.com." For example, for each URL included in "externalwebsite.com," the social networking system 130 determines a total of number of users indicating an interest in a URL, the number of users sharing the URL and the number of comments associated with the URL made by users and selects 620 a subset of URLs having the largest total.

After selecting 620 the subset of URLs, if the social networking system 130 determines that the user device 110 includes a cookie 114, or other authenticating data, identifying a user of the social networking system 130, the selected URLs may be ranked 630 according to social information of the identified user. For example, the subset of URLs are ranked 630 according to the number of interactions with a URL by friends of the identified user. If no cookie 114, or other authenticating information, is stored by the user device 110, the social networking system 130 does not rank the subset of the URLs.

The subset of URLs are then filtered 640 by one or more additional parameters. In one embodiment, the criteria used for filtering 640 the URLs are influenced by the URL included in the request for content. For example, if "externalwebsite.com" is a news website, the subset of URLs are filtered using a time decay to remove URLs outside of a specified time interval or to identify more recent URLs. As another example, if "externalwebsite.com" supplies local reviews, an affinity function associated with an identified user filters 640 the URLs to identify URLs likely to be aligned with the identified user's interests, and the URLs may be further filtered by location information to remove URLs associated with locations that are not near the user's location. After filtering, the highest ranked URLs are selected 650 and included in a recommendations display. If the social networking system 130 is unable to identify a cookie 114 or other authenticating data stored by the user device 110, the recommendations display also includes a login portion, as illustrated below in conjunction with FIG. 7B.

FIG. 7B shows an example of a rendered frame of personalized content 710B presenting an activity display including a recommendations display presenting URLs recommended based on interactions with URLs by multiple users of the social networking system 130. For example, the rendered frame of personalized content 710B includes URLs within identified domains that are most frequently accessed by users of the social networking system 130. The recommendations display presented by the rendered frame of personalized content 710B includes a login portion 720 prompting entry of authentication information, such as a login and password, specifying a user of the social networking system 130. Displaying the rendered frame of personalized content 710B allows a web page 122 from a third party website 120 to be augmented with information from the social networking system 130 identifying URLs included in the third party website 120 that have been frequently accessed by users of the social networking system 130.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein. For example, in one embodiment the computer-readable storage medium contains a markup language document for being rendered by a web browser application executing on a computer system. In this embodiment, the markup language document comprises information items encoded in a markup language comprising instructions for rendering information from a third-party website in a web browser application, as well as instructions to a web browser application to retrieve information associated with a user of a social networking system, as described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A method comprising:
   requesting a web page from a web server, wherein the web page is within a domain of a third-party website that is different from a domain of a social networking system;
   receiving at a user device a markup language document for the requested web page;

requesting information from the social networking system for presentation within the requested web page, wherein requesting information from the social networking system comprises sending an instruction to the social networking system to select the requested information based on one or more actions stored by the social networking system;

providing to the social networking system an indication of whether the user has an existing session with the social networking system by allowing the social networking system to access a cookie stored on the user device;

receiving the requested information from the social networking system, wherein the received requested information was determined by the social networking system based on actions stored by the social networking system and describing interactions taken by all users of the social networking system responsive to the indication provided to the social networking system specifying the user does not have an existing session with the social networking system;

rendering the web page and the content based on the obtained information within the web page; and displaying the rendered web page.

2. The method of claim 1, wherein requesting information from the social networking system comprises providing to the social networking system one or more parameters for selecting the requested information, wherein the requested information received from the social networking system is selected based on the parameters.

3. The method of claim 2, wherein the one or more parameters include at least a URL, domain, or network address for the requested information.

4. The method of claim 2, wherein the one or more parameters include at least a parameter selected from a group consisting of: keywords, interests, demographic information, location information, geo-location information, an instruction to apply affinity criteria, and an instruction to apply a decay factor.

5. The method of claim 1, wherein the received requested information includes a prompt for the user to establish a session with the social networking system.

6. The method of claim 5, further comprising:

responsive to receiving an interaction with the prompt for the user to establish the session with the social networking system, providing to the social networking system an indication the user has established the session with the social networking system;

receiving modified information from the social networking system, wherein the received modified information was determined by the social networking system based on social information associated with the user;

rendering the web page including the received modified information; and displaying the rendered web page including the received modified information.

7. The method of claim 6, wherein the received modified information comprises a set of content items that relate to (1) one or more actions performed by one or more other users with whom the user has established a connection in the social networking system, and (2) at least one specified URL or domain.

8. The method of claim 1, wherein the requested information received from the social networking system comprises a set of content items that relate to actions performed by all users of the social networking system and to one or more domains or uniform resource locators (URLs).

9. The method of claim 8, wherein the set of content items is determined based on one or more of: a number of content items where users of the social networking system express an interest in a URL, a number of content items where users of the social networking system post a comment to the social networking system discussing the URL, a number of content items where users of the social networking system post the URL, and a number of content items where users of the social networking system attend an event associated with the URL.

10. A method comprising:

receiving at a server of a social networking system a request for information based on an instruction in a markup language document, wherein the request for information is responsive to a request for a web page of a third-party website that is within a domain of a third-party website that is different from a domain of the social networking system, and the request indicates to select the requested information based on one or more actions stored by the social networking system;

identifying a user associated with the request by accessing a cookie stored on a user device from which the request was received;

determining whether the user has an existing session with the social networking system;

responsive to determining the user does not have an existing session with the social networking system, determining the requested information based on social information associated with the user based on actions stored by the social networking system and describing interactions taken by all users of the social networking;

sending the requested information as content displayed within the web page;

responsive to receiving a request from the user to establish a session with the social networking system, determining modified information based on social information associated with the user based on social information associated with the user, the modified information comprising a set of content items that relate to (a) one or more actions performed by one or more other users with whom the user has established a connection in the social networking system and (2) at least one specified URL or domain; and sending the modified information for display as content within the web page in place of the requested information.

11. The method of claim 10, wherein the request for information comprises one or more parameters for selecting the requested information, and wherein the determined requested information is selected based on the parameters.

12. The method of claim 11, wherein the one or more parameters include at least a URL, domain, or network address for the requested information.

13. The method of claim 11, wherein the one or more parameters include at least a parameter selected from a group consisting of: keywords, interests, demographic information, location information, geo-location information, an instruction to apply affinity criteria, and an instruction to apply a decay factor.

14. The method of claim 10, wherein the requested information includes a prompt for the user to establish a session with the social networking system.

15. The method of claim 10, wherein the requested information comprises a set of content items that relate to actions performed by all users of the social networking system and to one or more domains or uniform resource locators (URLs).

16. A computer program product comprising a non-transitory computer-readable storage medium having encoded thereon:
    content from a third-party website, the third party web site different from a domain of a social networking system;
    instructions that, when executed by a processor, cause the processor to:
        request information from the social networking system by sending an instruction to the social networking system to select the requested information based on one or more actions stored by the social networking system;
        provide to the social networking system an indication of whether a user associated with a user device including the processor has an existing session with the social networking system by allowing the social networking system to access a cookie stored on the user device including the processor;
        receive the requested information from the social networking system, wherein the received requested information was determined by the social networking system based on actions stored by the social networking system and describing interactions taken by all users of the social networking system responsive to the indication provided to the social networking system specifying the user does not have an existing session with the social networking system;
        render a web page including the content from the domain of a third-party website that is different from a domain of the social networking system and also including content rendered from the requested information received from the social networking system, and
        display the rendered web page on the user device.

17. The computer program product of claim 16, further comprising instructions that, when executed by the processor, cause the user device to request information from the social networking system by providing to the social networking system one or more parameters for selecting the requested information, wherein the requested information received from the social networking system is selected based on the parameters.

18. The computer program product of claim 17, wherein the one or more parameters include at least a URL, domain, or network address for the requested information.

19. The computer program product of claim 17, wherein the one or more parameters include at least a parameter selected from a group consisting of: keywords, interests, demographic information, location information, geo-location information, an instruction to apply affinity criteria, and an instruction to apply a decay factor.

20. The computer program product of claim 16, wherein the received requested information includes a prompt for the user to establish a session with the social networking system.

21. The computer program product of claim 20, further comprising instructions that, when executed by the processor, cause the user device to:
    provide an indication the user has established the session with the social networking system responsive to receiving an interaction with the prompt for the user to establish the session with the social networking system;
    receive modified information from the social networking system, wherein the received modified information was determined by the social networking system based on social information associated with the user;
    render the web page including content based on the received modified information within the web page; and
    display the rendered web page including the content based on the received modified information.

\* \* \* \* \*

UNITED STATES PATENT AND TRADEMARK OFFICE
CERTIFICATE OF CORRECTION

PATENT NO.        : 8,572,174 B2
APPLICATION NO.   : 13/551508
DATED             : October 29, 2013
INVENTOR(S)       : Mark E. Zuckerberg et al.

It is certified that error appears in the above-identified patent and that said Letters Patent is hereby corrected as shown below:

In the Claims

Claim 10, column 20, lines 38-39, after "user" delete "based on social information associated with the user".

Signed and Sealed this
Nineteenth Day of August, 2014

Michelle K. Lee
*Deputy Director of the United States Patent and Trademark Office*